United States Patent Office 2,811,515
Patented Oct. 29, 1957

2,811,515

LAKES AND THE PRODUCTION THEREOF

Emil Stocker, Riehen, near Basel, Switzerland, assignor to J. R. Geigy A. G., Basel, Switzerland, a Swiss firm No Drawing. Application January 27, 1956,
Serial No. 561,941

Claims priority, application Switzerland February 2, 1955

6 Claims. (Cl. 260—204)

The present invention concerns lakes which are distinguished by their remarkable fastness to light and slight migratory powers in organic binding agents or synthetic materials. It also concerns processes for the production of the new lakes, in addition processes for the production of high molecular natural and synthetic substances in the form of lacquers and plastic masses coloured fast to light with the new lakes.

It has been found that remarkably fast to light, practically non-migrating lakes are obtained if a diazotised aminobenzene sulphonic acid containing at least two acid dissociating water solubilising groups is coupled by methods known per se with an o-hydroxyaryl carboxylic acid arylamide coupling in the o-position to the hydroxyl group and the monoazo dyestuff obtained is laked by methods known per se with compounds of polyvalent metals.

The aminobenzene sulphonic acids used according to the present invention can contain, as further acid dissociating water solubilising groups, sulphonic acid and carboxyl groups and in addition, further substituents usual in azo dyestuffs, e. g. halogen, alkyl or alkoxy groups. The use of such aminobenzene sulphonic acids as diazo components which contain a carboxyl or a sulphonic acid group in the neighbouring position to the amino group is particularly advantageous.

The diazotisation can be performed as is usual with sodium nitrite in a mineral acid medium in the cold according to the direct or indirect method.

Of the coupling components used according to the present invention, the o-hydroxyaryl carboxylic acid arylamides coupling in the o-position to the hydroxyl group, preferably the 2.3 - hydroxynaphthoic acid arylamides which are derived from primary amines of the benzene and naphthalene series are used. They can contain the further substituents usual in azo dyestuffs in the arylamide radical, e. g. halogen, alkyl and alkoxy groups. Possibly, also 2-hydroxycarbazole-3-carboxylic acid arylamides or 3-hydroxycarbazole - 2 - carboxylic acid arylamides, further 3-hydroxydiphenylene oxide-2-carboxylic acid arylamides can be used. The coupling is performed in an alkaline medium or, when the azo components are finely distributed, also in weakly acid suspension in the presence of alkali metal salts of low fatty acids which buffer the mineral acid. On completion of the coupling, the dyestuff is either isolated and dissolved in fresh water or the coupling solution is neutralised, possibly warmed and then the soluble salts of polyvalent metals are added evenly to the dyestuff solution; advantageous are solutions of earth alkali or earth metals, possibly also solutions of manganese, iron, zirconium or tin salts. The lake is precipitated advantageously at temperatures of 80 to 100° C. Aqueous solutions of calcium chloride, strontium chloride or nitrate, barium chloride, aluminium sulphate, manganous chloride or manganous sulphate are examples of precipitating agents. The precipitating agents are used in such amounts that there is one dyestuff molecule to at least one polyvalent metal atom. It is of advantage, however, to use an excess of precipitating agent.

To attain lakes of a soft texture it is often advantageous if the monoazo dyestuffs are laked with metal salts in the presence of capillary active dispersing agents and/or of other protective substances which on drying, prevent the formation of a hard core. For this purpose, for example, solutions of alkali soaps of higher fatty acids, colophony soaps or also emulsions of fats, waxes, paraffines, fatty oils or of the plasticisers usual in the lacquer and plastics industry which are produced with the aid of soap or other emulgators, are suitable. It is also possible to perform the laking in the presence of substrata, e. g. in the presence of aluminium hydroxide, barium sulphate or titanium dioxide. Also mixed precipitates can be obtained with two or more different metal ions.

The precipitated lakes are then either isolated, dried and converted by milling into a form which is economical in use or they are further worked up as wet pastes, e. g. dispersed according to the flushing process in organic binding agents or plasticisers.

According to the method sketched above, vivid red to brown red lakes are obtained with the new dyestuffs which are distinguished by remarkable fastness to light and stability to heat. Due to these properties they are very suitable for pigmenting higher molecular natural and synthetic substances, for example in the form of lacquers or plastic masses and in particular for the dyeing of so-called stoving lacquers. Because of their slight tendency to migrate, they are very valuable in these substances.

The following examples serve to illustrate more clearly the subject matter of the invention without limiting it in any way. Where not otherwise stated, parts are given as parts by weight and the temperatures are in degrees centigrade. Where parts by volume are expressly mentioned, their relationship to parts by weight is as that of litres to kilogrammes.

*Example 1*

25.3 parts of aniline-2.5-disulphonic acid in the form of the monosodium salt are dissolved in 480 parts of water, cooled to 0 to 3° and, after the addition of 15 parts by volume of 10 N-hydrochloric acid, diazotised with 20.7 parts of sodium nitrite solution 33.3%.

Also 32.3 parts of β-hydroxynaphthoic acid-1-naphthylamide are dissolved with the aid of 66.5 parts of caustic soda lye 30% and 7 parts of Turkey red oil in 1800 parts of water at 90–95°. After the addition of a little decolourising carbon, the solution is filtered and the filtrate is brought up to 3000 parts by volume and to a temperature of 18–20°.

A cold solution of 27 parts of 80% acetic acid in 150 parts of water are added to the diazo solution and the mixture is quickly added while stirring to the solution of the coupling components. On completion of the coupling, the reaction is made neutral to litmus paper with sodium carbonate and the laking is performed as follows:

200 parts of a 2% linseed oil emulsion are added and 24 parts of calcium chloride dissolved in 160 parts of water are added dropwise within 15 minutes. The temperature is then raised to 75–80°, kept there for one hour and then the mixture is allowed to cool overnight. It is filtered, the precipitate is washed and dried at 70°.

The red lake is suitable, for example for the colouring of polyvinyl chloride in the mass where it is distinguished by a beautiful nuance, high fastness to light and stability to heat and migration. Also on more slightly pigmenting, the fastness to light is still astoundingly good.

If in this example the calcium chloride is replaced by equivalent amounts of strontium chloride, manganous chloride, aluminium sulphate, iron (III) chloride, tin (II)

chloride, tin (IV) chloride or zirconium oxychloride, then red to brown red lakes are obtained which are suitable for example for pigmenting stoving lacquers.

Example 2

A diazo solution is produced as in Example 1. Also 36.9 parts of β-hydroxynaphthoic acid-2.4-dimethoxy-5-chloranilide are dissolved with the aid of 250 parts by volume of 2 N-caustic soda lye and 7 parts of Turkey red oil in 1600 parts of water at 90–95°. After the addition of decolourising carbon, the solution is filtered and the filtrate is brought up to 3000 parts by volume and to a temperature of 38–40°.

180 parts by volume of 2 N-acetic acid are added to the diazo solution, the mixture is quickly added while stirring to the naphtholate solution and, on completion of the coupling the reaction is made neutral with sodium carbonate solution to litmus paper.

The coupling mixture is then heated to 85–90°, a solution of 40 parts of colophony soap in 1600 parts of water of 85° is added and laking is performed in 15 minutes by the addition dropwise of 60 parts of barium chloride dissolved in 250 parts of water. After another two hours, the mixture is allowed to cool, stirred overnight, filtered and the precipitate is washed and dried at 60°.

The lake produces somewhat more bluish red shades and has similar properties to those described in Example 1.

The sodium salt of the dyestuff can also be reacted with the equivalent amounts of strontium nitrate, manganous chloride, aluminium chloride, iron (III) chloride, tin (II) chloride, tin (IV) chloride, or zirconium oxychloride instead of with barium chloride. Red to brown red lakes are obtained which can be used for example to pigment lacquers.

Example 3

A diazo solution is prepared according to the information given in Example 1. Also 32.1 parts of β-hydroxynaphthoic acid-2-methyl-4-chloranilide are dissolved with the aid of 66.5 parts of caustic soda lye 30% and 7 parts of Turkey red oil in 1800 parts of water at 90–95°. The solution is brought to 2100 parts by volume and to a temperature of 36–38°, 50 parts by volume of 2 N-sodium carbonate solution and, while stirring, 20 parts of sodium bicarbonate are added and the clarified diazo solution is poured in within 30 minutes. When the coupling is complete, the solution is made neutral to litmus paper with acetic acid, heated to 85–90°, a solution of 25 parts of colophony soap in 1200 parts of water of 85° is added and, within 15 minutes, 42 parts of barium chloride dissolved in 175 parts of water are added. After heating for 2 hours at 85–90°, the mixture is allowed to cool overnight, filtered, the filter residue is washed and dried at 60°.

The lake is suitable, for example, for the production of brilliant red transparent stoving lacquers produced principally from urea-formaldehyde-alkyd resins and is distinguished by very good fastness to light and cross lacquering.

Example 4

25.3 parts of aniline-2.4-disulphonic acid in the form of its disodium salt are dissolved in 400 parts of water, 25 parts by volume of 10 N-hydrochloric acid are added and the solution is diazotised at 0–3° with 100 parts by volume of 1 N-nitrite solution.

Also 32.3 parts of β-hydroxynaphthoic acid-1-naphthylamide are dissolved with the aid of 67 parts of caustic soda lye 30% and 6.7 parts of Turkey red oil in 1800 parts of water at 95°. The solution is filtered, the volume is made up to 2000 parts and it is heated to 30–32° and 20 parts of sodium bicarbonate dissolved in 200 parts of water are quickly added while stirring. Immediately after the addition of the sodium bicarbonate, the clarified diazo solution is poured in within 15 minutes. When the coupling is complete, the reaction is made neutral to litmus paper with 10 N-hydrochloric acid.

After heating to 85–90°, a solution of 25 parts of colophony soap in 1200 parts of water of 80° is added and the product is precipitated in 15 minutes with 42 parts of barium chloride dissolved in 175 parts of water. The whole is heated for another hour at 85–90°, allowed to cool overnight, the product is filtered off, washed a little and dried at 60°.

Brilliant red, transparent stoving lacquers can be produced with this precipitation product which have good fastness to light and cross lacquering.

Example 5

26.7 parts of 1-methyl-2-aminobenzene-4.6-disulphonic acid (as sodium salt) are dissolved in 150 parts of water, 30 parts by volume of 10 N-hydrochloric acid are added and the solution is diazotised at 0–3° with 100 parts by volume of 1 N-sodium nitrite solution.

Also 36.9 parts of β-hydroxynaphthoic acid-2.4-dimethoxy-5-chloranilide are dissolved in 1800 parts of water at 90–95° with the addition of 66.5 parts of 30% caustic soda lye and 7 parts of Turkey red oil. After the addition of a little decolourising carbon, it is filtered and the volume is brought up to 3000 parts and the temperature to 18–20°.

180 parts by volume of 2 N-acetic acid at 5° are added to the diazo solution whereupon the mixture is quickly added while stirring to the naphtholate solution.

On completion of the coupling, the reaction is made neutral to litmus paper with sodium carbonate solution, 200 parts of a 2% emulsion of a vegetable oil are added and then 54 parts of barium chloride dissolved in 220 parts of water are added and the whole is heated for one hour at 75–80°. After cooling overnight, the product is filtered off, washed a little and dried.

The product can be used for the production of red stoving lacquers which have very good fastness to light and cross lacquering.

If in the above example, instead of 36.9 parts of β-hydroxynaphthoic acid-2.4-dimethoxy-5-chloranilide, 32.3 parts of β-hydroxynaphthoic acid-1-naphthylamide are used and otherwise the same procedure is followed, then a lake with a somewhat more yellow shade is obtained.

Example 6

A diazo solution is prepared, analogous to that in Example 1, from 21.7 parts of 2-amino-4-sulphobenzoic acid.

Also 36.9 parts of β-hydroxynaphthoic acid-2.4-dimethoxy-5-chloranilide are dissolved analogous to the method described in Example 1, and the coupling and laking is performed as given in that example. A red lake is obtained which, in polyvinyl chloride containing plasticisers, has good fastness to light and only a very slight tendency to bleeding.

Example 7

2-amino-5-sulphobenzoic acid diazotised, coupled with β-hydroxynaphthoic acid anilide and laking with calcium chloride as described in Example 1, produces a lake which in transparent stoving lacquers is brilliant orange-red and has very good fastness to light and cross lacquering.

Example 8

The barium lake of the dyestuff from 2-amino-5-sulphobenzoic acid and β-hydroxynaphthoic acid-1-naphthylamide produced according to Example 1 is brilliant red in transparent stoving lacquers and has very good fastness to light and cross lacquering.

Example 9

25.15 parts of 2-chloro-5-amino-4-sulphobenzoic acid are dissolved in 200 parts of water with the aid of 105 parts by volume of 2 N-sodium carbonate solution; 100 parts of 1 N-sodium nitrite are then added and, at 0–3°, 280 parts by volume of 1 N-hydrochloric acid are added while stirring within one hour, the temperature being kept at 0–3°.

Also 32.1 parts of β-hydroxynaphthoic acid-2-methyl-4-chloranilide are dissolved in 1800 parts of water at 95° with the addition of 6 parts of Turkey red oil and 66.5 parts of 30% caustic soda lye. A little decolourising carbon is added, the mixture is filtered and the filtrate is brought up to 2000 parts by volume and to a temperature of 0–3°. After the addition of 20 parts of sodium bicarbonate (as saturated solution), the diazo suspension is poured in within 10 minutes.

When the coupling is complete, the coupling mixture is neutralised with acetic acid, heated to 85–90°, 300 parts of 2% vegetable oil emulsion are added; a solution of 24 parts of calcium chloride in 160 parts of water is added within 15 minutes and the whole is heated for another 2 hours at 85–90°. After cooling overnight, the product is filtered off, washed a little and dried at 60°. In transparent stoving lacquers, the lake has a brilliant yellowish red shade and is fast to cross lacquering. It has good fastness to light.

If in the above example, 32.3 parts of β-hydroxynaphthoic acid-1-naphthylamide are used instead of 32.1 parts of β-hydroxynaphthoic acid-2-methyl-4-chloranilide and otherwise the same procedure is followed, then a lake having a similar nuance is obtained.

*Example 10*

67 parts of polyvinyl chloride, 33 parts of dioctyl phthalate 2 parts of dibutyl tin dilaurate and 0.65 part of the red lake according to Example 1 are homogeneously worked up on a set of hot mixing rollers. The mixture is then drawn out into a foil of the desired thickness.

*Example 11*

70 parts of a 60% solution of a modified urea-alkyd resin in xylene/butanol, 20 parts of turpentine oil, 10 parts of xylene and 4 parts of the red lake according to Example 3 are finely milled, sprayed onto the desired surface and stoved.

What I claim is:

1. The lake of a monoazo compound having the formula:

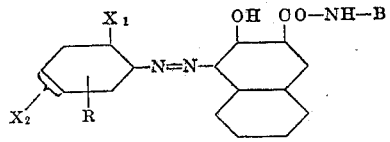

wherein one of $X_1$ and $X_2$ is $SO_3H$ and the other is selected from the group consisting of $SO_3H$ and $COOH$, R is a member selected from the group consisting of H, $CH_3$ and Cl, B represents an aromatic radical containing at least one six-membered carbocyclic nucleus and at most two such nuclei condensed with one another, with a polyvalent metal selected from the group consisting of calcium, strontium, barium, aluminium, zirconium, tin and manganese.

2. The calcium lake of the azo compound having the formula:

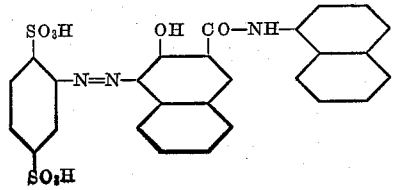

3. The barium lake of the azo compound having the formula:

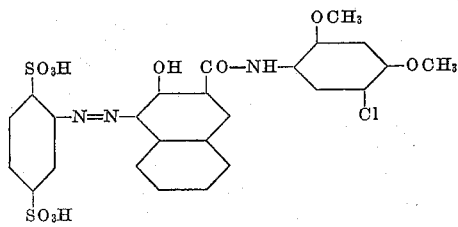

4. The barium lake of the azo compound having the formula:

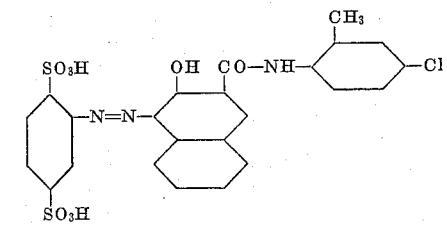

5. The calcium lake of the azo compound having the formula:

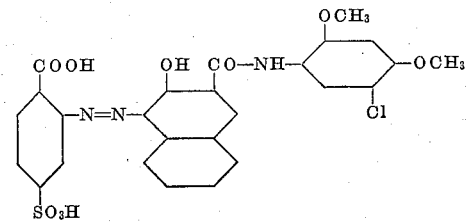

6. The barium lake of the azo compound having the formula:

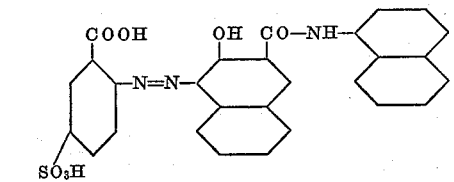

References Cited in the file of this patent

UNITED STATES PATENTS 1,951,298    Wagner _____ Mar. 13, 1934
2,070,104    Zerweck et al. _____ Feb. 9, 1937

OTHER REFERENCES

Soc. of Dyers and Colourists, Color Index, 1924 supp., p. 166.

Pratt: Chemistry and Physics of Organic Pigments, Wiley and Sons, 1947, p. 108.

Lubs: Chemistry of Synthetic Dyes and Pigments, p. 7, Reinhold Publ. Corp., New York, N. Y. (1955).